United States Patent
Miranda et al.

(10) Patent No.: US 10,352,205 B2
(45) Date of Patent: Jul. 16, 2019

(54) VARIABLE CAM PHASER WITH DAMPER

(71) Applicant: Schaeffler Technologies AG & Co. KG, Herzogenaurach (DE)

(72) Inventors: André Vieira de Miranda, Sterling Heights, MI (US); Dan Zehan, Windsor (CA)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 51 days.

(21) Appl. No.: 15/633,039

(22) Filed: Jun. 26, 2017

(65) Prior Publication Data

US 2018/0371962 A1 Dec. 27, 2018

(51) Int. Cl.
| | | |
|---|---|---|
| *F01L 1/344* | (2006.01) | |
| *F16F 15/126* | (2006.01) | |
| *F01L 1/047* | (2006.01) | |
| *F01L 1/02* | (2006.01) | |

(52) U.S. Cl.
CPC .............. *F01L 1/344* (2013.01); *F01L 1/047* (2013.01); *F16F 15/126* (2013.01); *F01L 1/022* (2013.01); *F01L 2001/34496* (2013.01); *F01L 2103/00* (2013.01)

(58) Field of Classification Search
CPC ....... F01L 1/344; F01L 1/047; F01L 2103/00; F01L 1/022; F01L 2001/34496; F16F 15/126

See application file for complete search history.

(56) References Cited

U.S. PATENT DOCUMENTS

| | | | |
|---|---|---|---|
| 2,411,373 A | 11/1946 | Holowenko | |
| 6,336,882 B1* | 1/2002 | Ullein | F01L 1/02 474/161 |
| 9,086,115 B2 | 7/2015 | He | |
| 2002/0108588 A1* | 8/2002 | Komorowski | F01L 1/02 123/41.44 |
| 2006/0201462 A1* | 9/2006 | Schafer | F01L 1/022 123/90.17 |
| 2009/0199801 A1* | 8/2009 | Imai | F01L 1/022 123/90.17 |
| 2009/0260589 A1 | 10/2009 | Ottersbach et al. | |
| 2011/0179782 A1 | 7/2011 | Huegel et al. | |
| 2012/0055281 A1 | 3/2012 | Huegel | |
| 2012/0111295 A1 | 5/2012 | Plate et al. | |
| 2014/0007830 A1* | 1/2014 | Schaefer | F01L 1/344 123/90.17 |
| 2014/0102392 A1 | 4/2014 | Busse | |
| 2016/0348759 A1* | 12/2016 | McCloy | F16H 1/2863 |

FOREIGN PATENT DOCUMENTS

WO WO-2006103004 A1 * 10/2006 ............. F01L 1/022

OTHER PUBLICATIONS

WO-2006103004 english language machine translation.*

* cited by examiner

*Primary Examiner* — Mark A Laurenzi
*Assistant Examiner* — Wesley G Harris
(74) *Attorney, Agent, or Firm* — Volpe and Koenig, P.C.

(57) ABSTRACT

A variable cam phaser system including a variable cam phaser and a vibration damper fixed to the variable cam phaser is disclosed. A method for damping vibration for a variable cam phaser is also disclosed. The method includes providing a variable cam phaser, providing a vibration damper, and fixing the vibration damper to the variable cam phaser.

18 Claims, 5 Drawing Sheets

VARIABLE CAM PHASER WITH DAMPER

FIELD OF INVENTION

This application is generally related to a variable cam phaser, and is more particularly related to a vibration damper for a cam phaser.

BACKGROUND

Valve train systems experience unwanted vibrations caused by a variety of sources, such as engine oscillations, timing chain oscillations, and other components. These vibrations adversely affect the operation of the valve train system. In particular, these vibrations may cause misalignment of valve train components, undesirable noise, and wear on the valve train components. It would be desirable to provide a system and method for damping vibrations in a valve train system.

SUMMARY

To address unwanted vibrations in a valve train system, a variable cam phaser system including a variable cam phaser and a vibration damper fixed to the variable cam phaser is provided.

In one embodiment, the vibration damper is fixed to the variable cam phaser via a mechanical fastener. In one embodiment, the vibration damper is fixed to the variable cam phaser by welding, crimping, or swaging.

In one embodiment, the vibration damper is a centrifugal pendulum damper. The centrifugal pendulum damper includes at least two flanges, each one of the at least two flanges defining a plurality of tracks, a plurality of pins extending between the at least two flanges and supported to slide within a respective one of the plurality of tracks, and a plurality of pendulum masses supported between the at least two flanges and supported on the plurality of pins.

In another embodiment, a method for damping vibration for a variable cam phaser is provided. The method includes providing a variable cam phaser, providing a vibration damper, and fixing the vibration damper to the variable cam phaser.

Preferred arrangements with one or more features of the invention are described below and in the claims.

BRIEF DESCRIPTION OF THE DRAWINGS

The foregoing Summary as well as the following Detailed Description will be best understood when read in conjunction with the appended drawings. In the drawings.

DETAILED DESCRIPTION OF THE PREFERRED EMBODIMENTS

Figure 1:
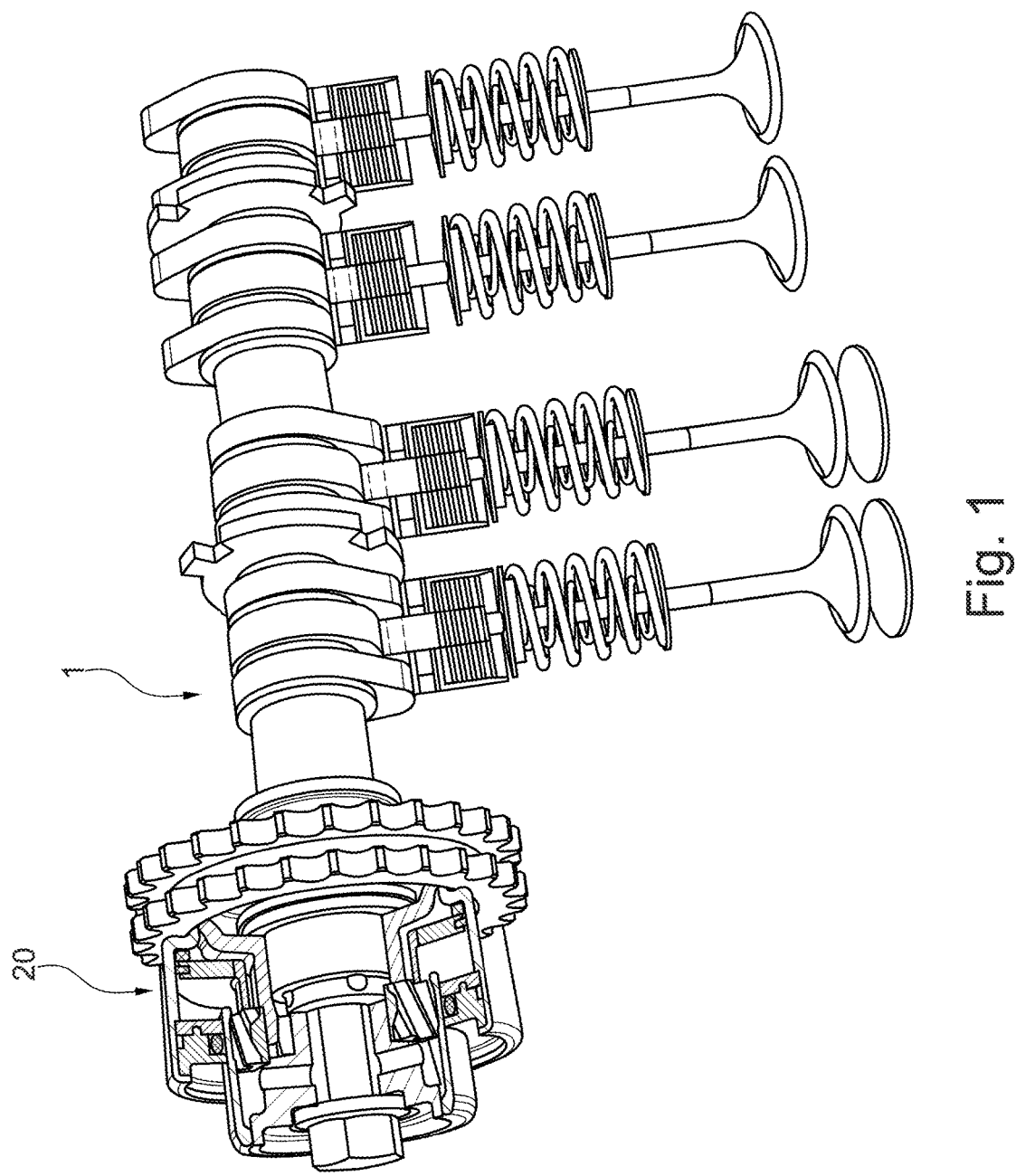
FIG. 1 illustrates a variable cam phaser in an engine valve train.

Certain terminology is used in the following description for convenience only and is not limiting. The words "inner," "outer," "inwardly," and "outwardly" refer to directions towards and away from the parts referenced in the drawings. A reference to a list of items that are cited as "at least one of a, b, or c" (where a, b, and c represent the items being listed) means any single one of the items a, b, c or combinations thereof. The terminology includes the words specifically noted above, derivates thereof, and words of similar import.

FIG. 1 illustrates an engine valve train 1 including a variable cam phaser 20. As shown in FIGS. 4-7, a variable cam phaser system 10 including a variable cam phaser 20 and a vibration damper 30 fixed to the variable cam phaser 20 is disclosed. In one embodiment, a method for damping vibration for a variable cam phaser system 10 is disclosed. The method includes providing a variable cam phaser 20, providing a vibration damper 30, and fixing the vibration damper 30 to the variable cam phaser 20.

The variable cam phaser 20 is configured to advance or retard a camshaft (shown in FIG. 1). One of ordinary skill in the art would recognize the components and function of the variable cam phaser 20, such as disclosed in U.S. Pub. 2014/0102392, U.S. Pub. 2009/0260589, and U.S. Pub. 2012/0111295, which are each incorporated herein by reference as if fully set forth.

Figure 3:
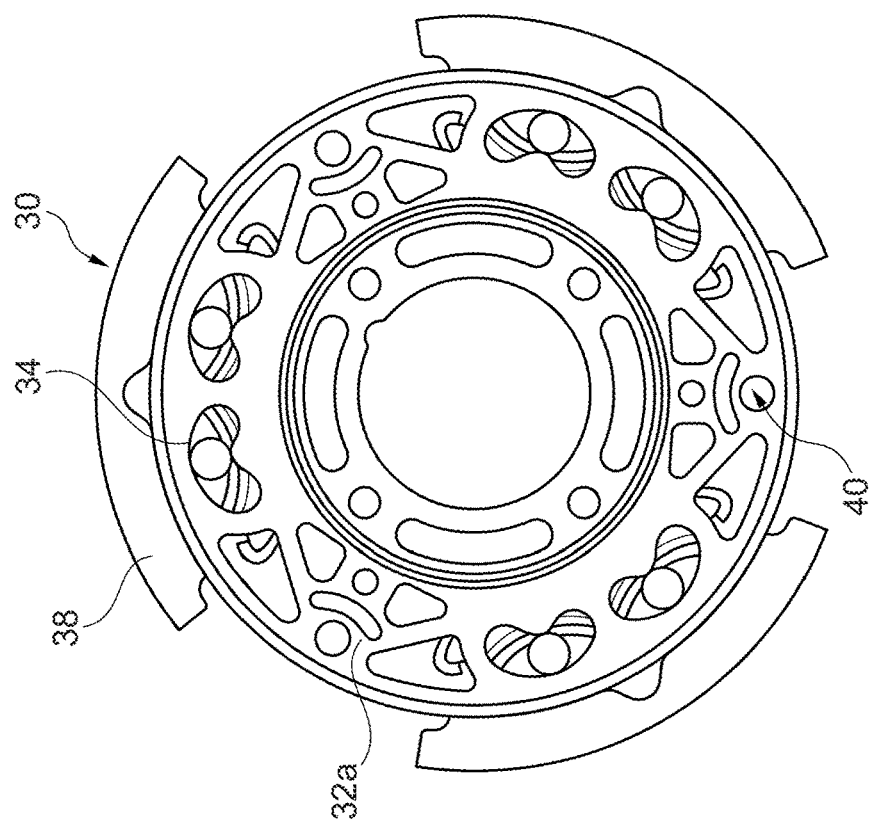
FIG. 3 is a front view of the vibration damper of FIG. 2.
Figure 2:
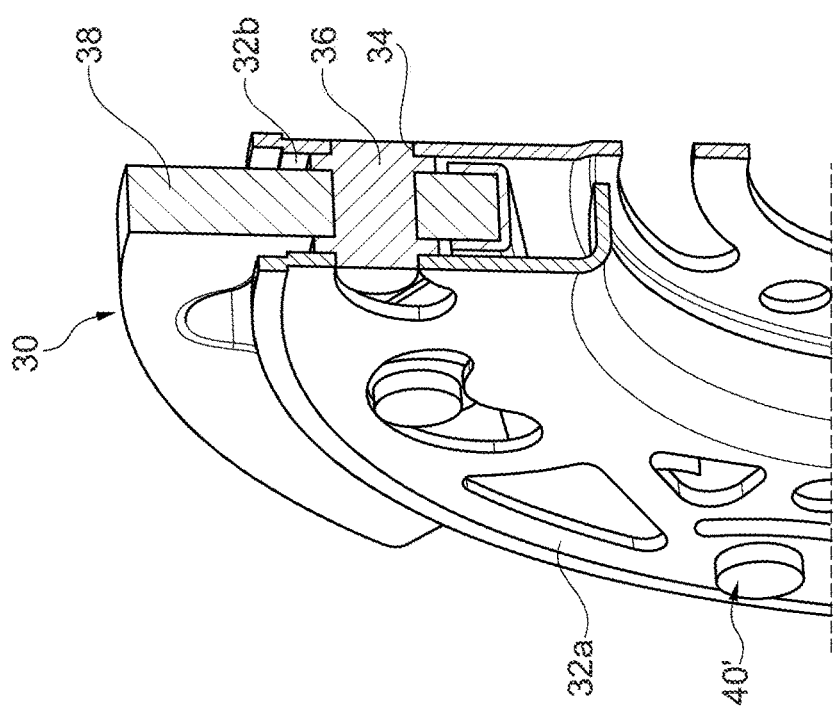
FIG. 2 is a partial cross section view of a vibration damper.

In one embodiment, the vibration damper 30 is a centrifugal pendulum damper, which is shown in more detail in FIGS. 2 and 3. In one embodiment, the centrifugal pendulum damper 30 includes at least two flanges 32a, 32b, each one of the at least two flanges 32a, 32b defining a plurality of tracks 34. The tracks 34 preferably have an arcuate path. In one embodiment, the two flanges 32a, 32b are fixed to each other by a mechanical fastener 40', such as a bolt or a rivet. One of ordinary skill in the art would recognize from the present disclosure that alternative arrangements for fixing the flanges 32a, 32b can be used. Additionally, alternative types of vibration dampers 30 can be used that include more or less than two flanges 32a, 32b.

A plurality of pins 36 extend between the at least two flanges 32 and are supported to slide within a respective one of the plurality of tracks 34. A plurality of pendulum masses 38 are supported between the at least two flanges 32a, 32b and supported on the plurality of pins 36. Each one of the plurality of pendulum masses 38 is supported on at least two of the plurality of pins 36. The arrangement and spacing of the masses 38 and pins 36 provide for effective vibration dampening. The quantity, positioning, and dimensions of the masses 38 and pins 36 can be varied to accommodate higher or lower levels of damping. One of ordinary skill in the art would recognize from the present disclosure that the subcomponents of the vibration damper 30 can be modified. One of ordinary skill in the art would recognize that alternative types of vibration dampers could be used, such as disclosed in U.S. Pat. No. 2,411,373, U.S. Pub. 2011/0179782, and U.S. Pub. 2012/0055281, which are each incorporated herein by reference as if fully set forth.

Figure 4:
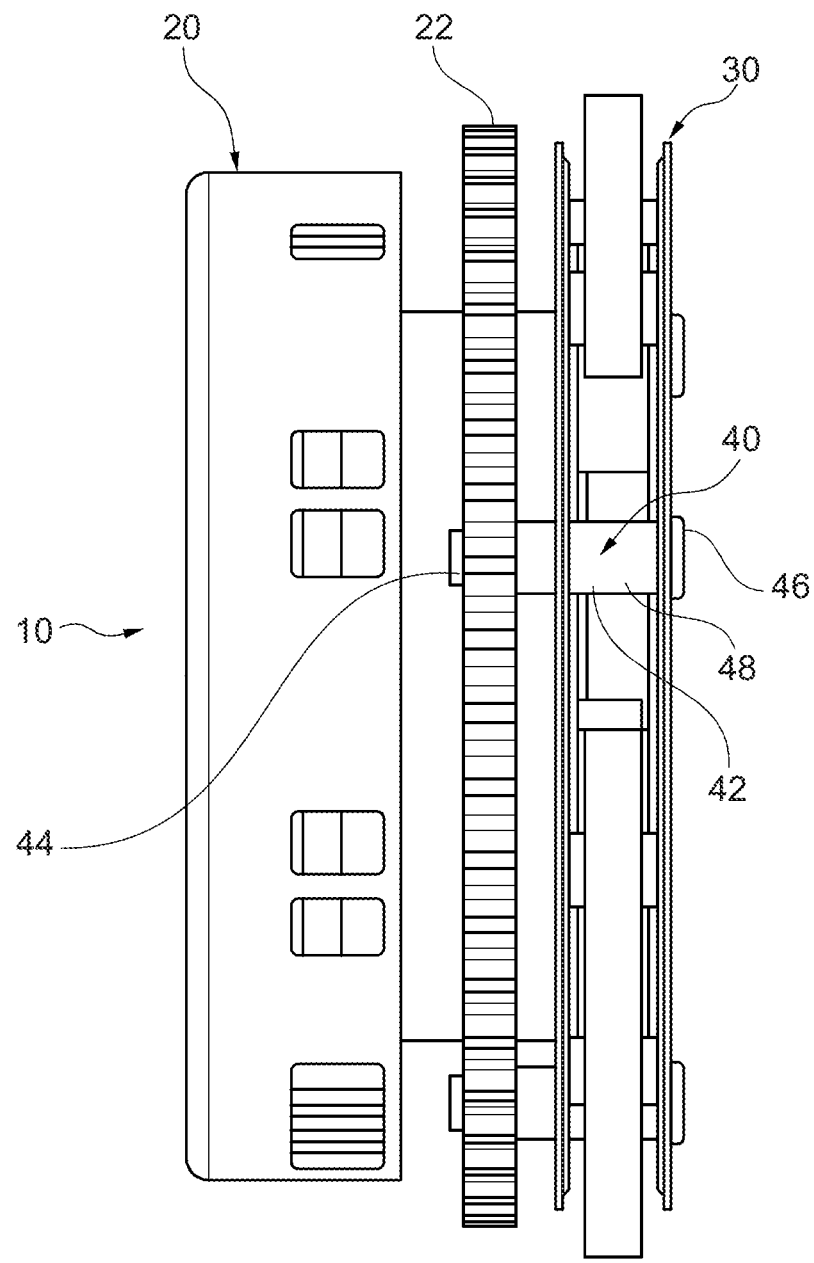
FIG. 4 is a side view of a variable cam phaser system including a vibration damper.
Figure 5:
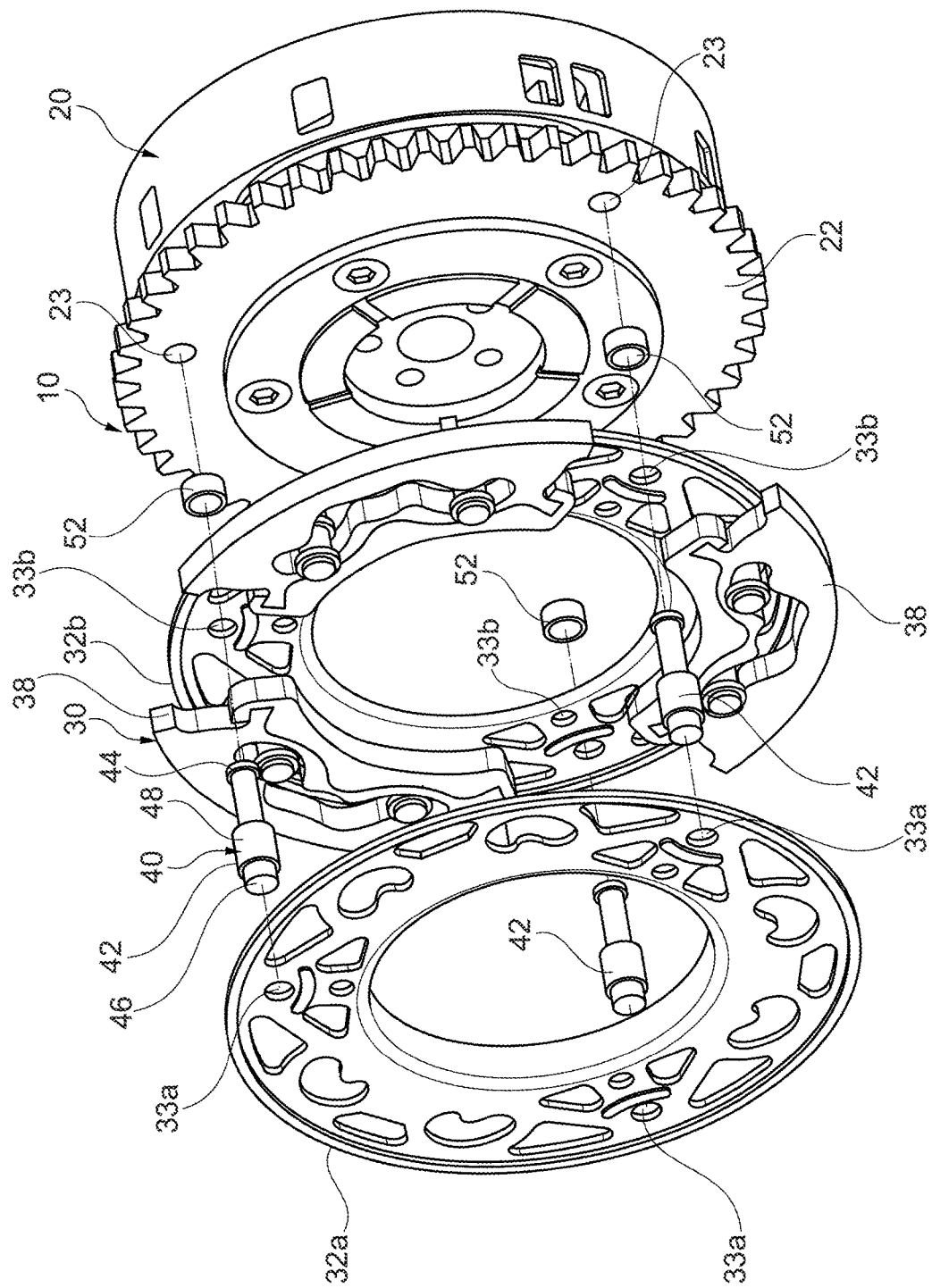
FIG. 5 is an exploded view of the variable cam phaser system of FIG. 4.
Figure 7:
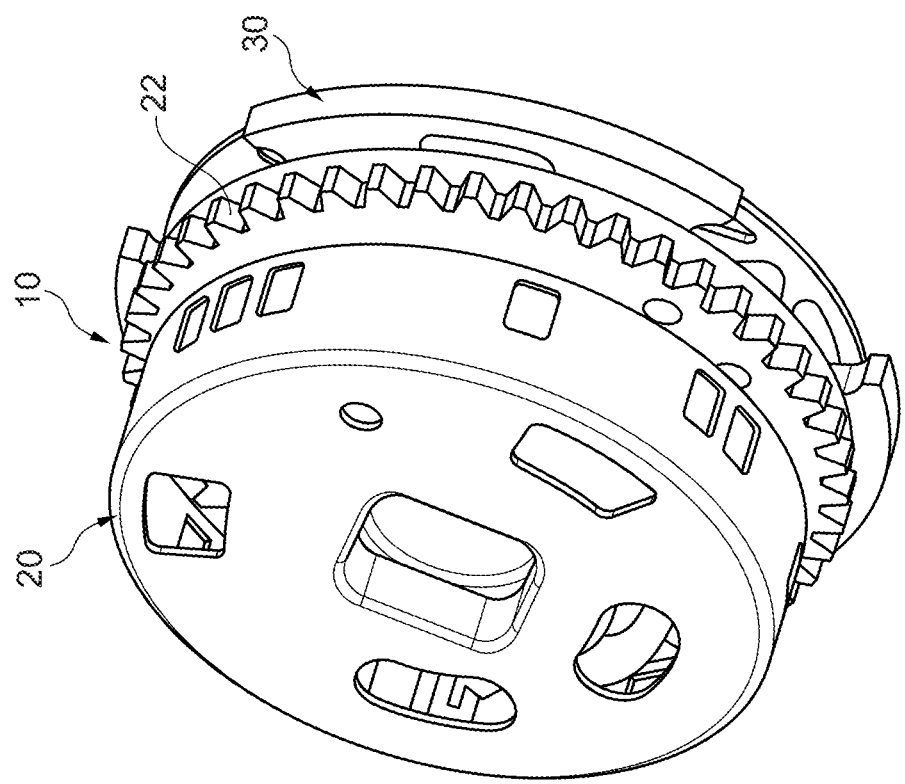
FIG. 7 is a front perspective view of the variable cam phaser system of FIGS. 4-6.
Figure 6:
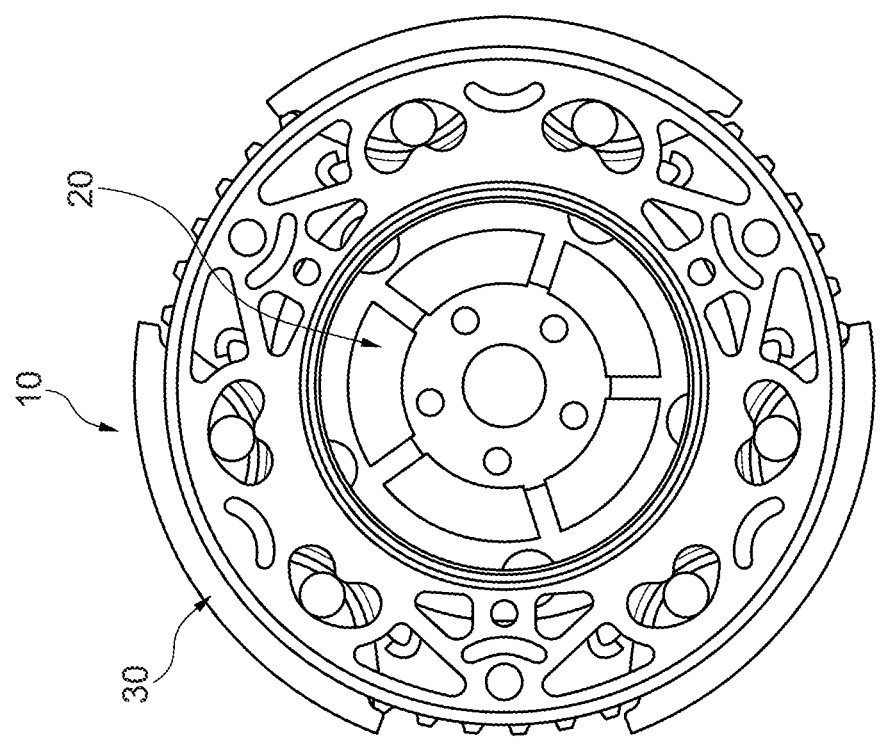
FIG. 6 is a rear view of the variable cam phaser system of FIGS. 4 and 5.

The vibration damper 30 is preferably fixed to the variable cam phaser 20 by a mechanical fastener 40, shown most clearly in FIGS. 4 and 5. In one embodiment, the mechanical fastener 40 includes a plurality of rivets 42 distributed around a periphery of the vibration damper 30 and the variable cam phaser 20. Each rivet 42 includes a first end 44 fixed to the variable cam phaser 20, and a second end 46 fixed to the vibration damper 30. In one embodiment, the first end 44 of each rivet 42 is fixed to a sprocket 22 of the variable cam phaser 20 and the second end 46 of each rivet 42 is fixed to at least one flange 32a, 32b of the vibration damper 30. In one embodiment, the rivet 42 is attached to both flanges 32a, 32b of the vibration damper 30. In other embodiments, the rivet 42 can be attached to a single one of flanges 32a, 32b, or can be attached to a different component of the vibration damper 30. Although three rivets 42 are shown in FIG. 5, one of ordinary skill in the art would recognize that the number of rivets 42 can be increased or decreased depending on the particular geometry and application of the vibration damper 30 and the variable cam phaser 20.

As shown in FIG. 5, the rivets 42 extends through axially aligned fastening holes 33a, 33b in the flanges 32a, 32b of the vibration damper 30, as well as fastening holes 23 formed in the sprocket 22 of the variable cam phaser 20. The fastening holes 33a, 33b are illustrated as being arranged circumferentially between the pendulum masses 38 in FIG. 5, however one of ordinary skill in the art would recognize from the present disclosure that alternative configurations, spacing, quantities, and arrangements for the fastening holes 33a, 33b can be used.

As shown in FIG. 5, the mechanical fastener 40 includes a flange spacer 48 configured to axially space the flanges 32a, 32b of the vibration damper 30 from each other. The flange spacers 48 provide sufficient axially spacing between the flanges 32a, 32b such that a space is provided for the pendulum masses 38. A secondary spacer 52 is axially arranged between the variable cam phaser 20 and the vibration damper 30. The secondary spacer 52 preferably includes at least three spacers 52 distributed around the periphery of the variable cam phaser 20 and the vibration damper 30. One of ordinary skill in the art would recognize from the present disclosure that the vibration damper 30 can be fixed to the variable cam phaser 20 by other fixing methods or configurations, such as welding, crimping, swaging or any other suitable mechanical connection.

Although the vibration damper 30 is illustrated as being mounted to the side of the variable cam phaser 20 that includes the sprocket 22, one of ordinary skill in the art recognizes that the vibration damper 30 could be mounted in any position relative to the variable cam phaser 20 as long as a mechanical fastening between the variable cam phaser 20 and the vibration damper 30 is provided. For example, the vibration damper 30 could be arranged concentrically around a housing of the variable cam phaser 20, or mounted on a side opposite from the sprocket 22 of the variable cam phaser 20.

Having thus described various embodiments of the present method and variable cam phaser system in detail, it will be appreciated and apparent to those skilled in the art that many changes, only a few of which are exemplified in the detailed description above, could be made in the method and variable cam phaser system according to the invention without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

LOG OF REFERENCE NUMERALS engine valve train 1
variable cam phaser system 10
variable cam phaser 20
sprocket 22
fastening hole 23
vibration damper 30
flange 32a, 32b
fastening hole 33a, 33b
track 34
pin 36
pendulum mass 38
mechanical fastener 40, 40'
rivet 42
first end of rivet 44
second end of rivet 46
flange spacer 48
secondary spacer 52

What is claimed is:

1. A variable cam phaser system comprising:
a variable cam phaser; and
a vibration damper fixed to the variable cam phaser, and the vibration damper is a centrifugal pendulum damper including at least one pendulum mass arranged between at least two flanges.

2. The variable cam phaser system of claim 1, wherein the vibration damper is fixed to the variable cam phaser via a mechanical fastener.

3. The variable cam phaser system of claim 2, wherein the mechanical fastener includes a plurality of rivets distributed around a periphery of the vibration damper and the variable cam phaser.

4. The variable cam phaser system of claim 3, wherein each said rivet of the plurality of rivets includes a first end fixed to the variable cam phaser, and a second end fixed to the vibration damper.

5. The variable cam phaser system of claim 4, wherein the first end of each said rivet is fixed to a sprocket of the variable cam phaser and the second end of each said rivet is fixed to a flange of the vibration damper.

6. The variable cam phaser system of claim 1, wherein the vibration damper is fixed to the variable cam phaser by welding, crimping, or swaging.

7. The variable cam phaser system of claim 1, wherein each one of the at least two flanges defining a plurality of tracks, a plurality of pins extending between the at least two flanges and supported to slide within a respective one of the plurality of tracks, the pendulum mass includes a plurality of pendulum masses and the plurality of pendulum masses supported between the at least two flanges and supported on the plurality of pins.

8. The variable cam phaser system of claim 7, wherein each one of the plurality of pendulum masses is supported on at least two of the plurality of pins.

9. The variable cam phaser system of claim 1, wherein the variable cam phaser is configured to advance or retard a camshaft.

10. A variable cam phaser system comprising:
a variable cam phaser;
a vibration damper fixed to the variable cam phaser the vibration damper is a centrifugal pendulum damper;
wherein the centrifugal pendulum damper includes a plurality of pendulum masses and a plurality of pins, and each one of the plurality of pendulum masses is supported on at least two of the plurality of pins.

11. The variable cam phaser system of claim 10, wherein the vibration damper is fixed to the variable cam phaser via a mechanical fastener.

12. The variable cam phaser system of claim 11, wherein the mechanical fastener includes a plurality of rivets distributed around a periphery of the vibration damper and the variable cam phaser.

13. The variable cam phaser system of claim 12, wherein each said rivet of the plurality of rivets includes a first end fixed to the variable cam phaser, and a second end fixed to the vibration damper.

14. The variable cam phaser system of claim 13, wherein the first end of each said rivet is fixed to a sprocket of the variable cam phaser, and the second end of each said rivet is fixed to a flange of the vibration damper.

15. The variable cam phaser system of claim 10, wherein the centrifugal pendulum damper includes at least two flanges, each one of the at least two flanges defining a plurality of tracks, the plurality of pins extending between the at least two flanges and supported to slide within a respective one of the plurality of tracks, and the plurality of pendulum masses supported between the at least two flanges.

16. The variable cam phaser system of claim 10, wherein the variable cam phaser is configured to advance or retard a camshaft.

17. The variable cam phaser system of claim 10, wherein the vibration damper is fixed to the variable cam phaser by welding, crimping, or swaging.

18. A method for damping vibration for a variable cam phaser, the method comprising:
   providing a variable cam phaser;
   providing a vibration damper; and
   fixing the vibration damper to the variable cam phaser;
   the vibration damper is a centrifugal pendulum damper;
   wherein the centrifugal pendulum damper includes a plurality of pendulum masses and a plurality of pins, and each one of the plurality of pendulum masses is supported on at least two of the plurality of pins.

* * * * *